(12) United States Patent
Hutchin (10) Patent No.: US 11,578,977 B1
(45) Date of Patent: Feb. 14, 2023

(54) VERTICAL NAVIGATION SYSTEM

(71) Applicant: Optical Physics Company, Reno, NV (US)

(72) Inventor: Richard A. Hutchin, Reno, NV (US)

(73) Assignee: Optical Physics Company, Reno, NV (US)

( * ) Notice: Subject to any disclaimer, the term of this patent is extended or adjusted under 35 U.S.C. 154(b) by 307 days.

(21) Appl. No.: 16/828,454

(22) Filed: Mar. 24, 2020

Related U.S. Application Data (60) Provisional application No. 62/823,321, filed on Mar. 25, 2019.

(51) Int. Cl.
*G01C 21/02* (2006.01)
*G01J 1/04* (2006.01)
*G01V 7/16* (2006.01)

(52) U.S. Cl.
CPC .......... *G01C 21/025* (2013.01); *G01J 1/0414* (2013.01); *G01V 7/16* (2013.01)

(58) Field of Classification Search
CPC ........ G01C 21/025; G01J 1/0414; G01V 7/16
See application file for complete search history.

(56) References Cited

U.S. PATENT DOCUMENTS 6,082,194 A * 7/2000 Gladwin ................. G01V 7/16
73/382 G
2017/0299428 A1* 10/2017 Mandel ................... G01S 17/08

* cited by examiner

*Primary Examiner* — Georgia Y Epps
*Assistant Examiner* — Don J Williams
(74) *Attorney, Agent, or Firm* — Alonzo & Associates; Arlyn Alonzo (57) ABSTRACT

Aspects of the disclosure are directed to acquiring aligned geographic coordinates of a vertical position. In one aspect, a vertical navigation system includes a light source to generate a source beam; a beam splitter to generate a first and a second source references derived from the source beam; a hollow retroreflector to produce a first and a second vertical references derived from the first and the second source references; an attitude sensor to capture a plurality of reference stars and to measure a first set of angles for the first vertical reference and a second set of angles for the second vertical reference, the first set of angles and the second set of angles are relative to the plurality of reference stars; and a processor to produce the aligned geographical coordinates using the first set of angles, the second set of angles, a gravity vector measurement and a time signal.

13 Claims, 6 Drawing Sheets

VERTICAL NAVIGATION SYSTEM

CLAIM OF PRIORITY UNDER 35 U.S.C. § 119

The present Application for Patent claims priority to Provisional Application No. 62/823,321 entitled "Vertical Navigation System" filed Mar. 25, 2019, and assigned to the assignee hereof and hereby expressly incorporated by reference herein.

TECHNICAL FIELD

This disclosure relates generally to the field of navigation system, and, in particular, to acquiring geographic coordinates using a vertical navigation system.

BACKGROUND

Navigation systems are commonly used for position determination of a user in a geometric reference frame. One commonly used geometric reference frame on or near the Earth's surface uses geographic coordinates (e.g., latitude and longitude) to determine a position. The geographic coordinates are a rotating geometric reference frame due to the rotation of the Earth. A desired output of a navigation system may be the latitude and longitude of a user to determine its position in the geometric reference frame. One type of navigation system is a satellite navigation system which has global coverage and a position determination accuracy of a few meters, (e.g. 1-10 m position accuracy). Since satellite navigation systems may use active (i.e., transmitted) navigation signals which generally have a low signal/noise ratio at a receiver, they may be susceptible to service disruption due to both unintended interference (e.g., other co-located radio systems) and intentional interference (e.g., jamming). As a consequence, service availability of satellite navigation systems may be degraded, particularly in critical times (e.g., military conflict, natural disasters, emergency situations, etc.) due to service disruptions. Therefore, there is a need for a navigation system for position determination which can operate independent of the GPS network while providing tactically useful geolocation . . . .

One type of navigation technology used in GPS-denied environments is an unmanned, passive high-accuracy navigation system which avoids the usage of GPS or active transmissions. This type of navigation sensor may be applied for defense applications such as unmanned surface vehicles which require extremely high accuracy to navigate autonomously around obstacles, shoals and restricted areas in open waters without revealing their locations. Sensors of this type may have the advantage of maintaining covertness in operations without being susceptible to GPS denial. Consequently, an unmanned, passive high-accuracy navigation system may be considered a sensitive defense technology, subject to export restrictions.

This type of navigation sensor may be applied for defense applications such as an unmanned surface vessel (USV) which needs to maintain accurate awareness of its location on the earth's surface without GPS or revealing the vessel's location. Consequently, an unmanned passive navigation system without GPS or active emissions may be considered a sensitive defense technology, subject to export restrictions.

Another type of navigation technology used in GPS-denied environments is an optically-aided, non-GPS system for aircraft navigation over water. This type of navigation sensor may be applied for defense applications such as providing a capability using optically-sensed features of the environment and ocean as external references for augmenting aircraft navigation when flying over water without the use of GPS. Consequently, an optically-aided non-GPS system for aircraft navigation over water may be considered a sensitive defense technology, subject to export restrictions.

Given the above examples of navigation technologies that have been considered sensitive defense technology and are subject to export restrictions, the present disclosure described in the Summary and the Detailed Descriptions are likely to be subjected to export restrictions as well.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a vertical navigation system for acquiring geographic coordinates. Accordingly, a method for acquiring one or more aligned geographic coordinates of a vertical position using a vertical navigation system, the method including: generating a first vertical reference and a second vertical reference using a source beam; measuring one or more sensor coordinates of the first vertical reference, the second vertical reference and a background star field; determining one or more angular coordinates of an aligned vertical reference using a gravity vector measurement and the one or more sensor coordinates of the first vertical reference, the second vertical reference and the background star field; and combining the one or more angular coordinates of the aligned vertical reference with a time signal to produce the one or more aligned geographical coordinates of the vertical position.

In one example, the method further includes operating the source beam at visible wavelengths, infrared wavelengths or ultraviolet wavelengths. In one example, the first vertical reference is a retroreflected beam. In one example, the second vertical reference is a reflected gravity reference beam. In one example, the method further includes using a reflective surface to reflect the second vertical reference. In one example, the reflective surface is associated with a gravity sensor. In one example, the method further includes using the gravity sensor to measure alignment of the reflective surface with respect to a gravity vector.

In one example, the second vertical reference is a reflected gravity reference beam. In one example, the one or more sensor coordinates include one or more of: a first sensor coordinate associated with the first vertical reference, a second sensor coordinate associated with the second vertical reference, or a third sensor coordinate associated with the background star field. In one example, the one or more sensor coordinates include a sensor coordinate associated with two or more of the first vertical reference, the second vertical reference or the background star field. In one example, the attitude sensor is a star tracker.

In one example, the method further includes using a reflective pool along with the source beam to generate the second vertical reference. In one example, the reflective pool is a reflective liquid or a liquid metal. In one example, the reflective liquid is one of liquid mercury or liquid gallium.

Another aspect of the disclosure provides a method for acquiring one or more aligned geographic coordinates of a vertical position using a vertical navigation system, the method including: generating a vertical reference using a source beam and a gravity vector measurement; measuring one or more sensor coordinates of the vertical reference and a background star field; determining one or more angular coordinates of an aligned vertical reference using the gravity vector measurement and the one or more sensor coordinates of the vertical reference and the background star field; and combining the one or more angular coordinates of the aligned vertical reference with a time signal to produce the one or more aligned geographical coordinates of the vertical position.

Another aspect of the disclosure provides a vertical navigation system, including: a light source to generate a source beam; a beam splitter coupled to the light source, the beam splitter to generate a first source reference and a second source reference, wherein the first source reference and the second source reference are derived from the source beam; a hollow retroreflector coupled to the beam splitter, the hollow retroreflector to produce a first vertical reference and a second vertical reference, wherein the first vertical reference is derived from the first source reference and the second vertical reference is derived from the second source reference; an attitude sensor coupled to the hollow retroreflector, the attitude sensor to capture a plurality of reference stars and to measure a first set of angles for the first vertical reference and a second set of angles for the second vertical reference, wherein the first set of angles and the second set of angles are relative to the plurality of reference stars; and a processor coupled to the attitude sensor, the processor to produce one or more aligned geographical coordinates of a vertical position using the first set of angles, the second set of angles, a gravity vector measurement and a time signal.

In one example, the light source is a laser or a coherent light source. In one example, the light source operates at visible, infrared or ultraviolet wavelengths. In one example, the first source reference and the second source reference are derived from the source beam using a retroreflector and a reflective surface. In one example, the reflective surface is a mirror or a gravity mirror.

In one example, the vertical navigation system further includes a gravity sensor, wherein the gravity sensor is coupled to the reflective surface. In one example, the gravity sensor measures an alignment of the reflective surface to produce the gravity vector measurement. In one example, the attitude sensor is a star tracker or star sensor. In one example, the attitude sensor uses one or more celestial coordinates. In one example, the plurality of reference stars includes at least two known celestial coordinates.

In one example, one of the at least two known celestial coordinates is declination and another of the at least two known celestial coordinates is right ascension. In one example, the time signal includes a time message and a time synchronization pulse. In one example, the aligned geographical coordinates are latitude and longitude of the vertical position.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Navigation systems are used for position determination of a user without a priori knowledge of user location. In one example, the user may be stationary or mobile. The user may be a person or an object. There are many examples of navigation systems such as radio navigation, electromagnetic navigation, satellite navigation, inertial navigation, celestial navigation, radar navigation, etc. Navigation systems may be active (i.e., employ man-made generated signals), passive (i.e., use naturally generated signals) or hybrid (i.e., a combination of both active and passive systems). Electromagnetic navigation systems, such as satellite navigation systems, may be used to obtain an accurate position determination of a user by receiving one or a plurality of electromagnetic signals from one or a plurality of transmitters at known locations. For example, the electromagnetic signals are radio signals. For example, radio signals are electromagnetic signals with frequency up to 300 GHz. For example, radio signals are microwave signals. In one example, the plurality of electromagnetic signals from the plurality of transmitters are synchronized in time (i.e., coordinated to have the same time reference).

For example, the time synchronization of the plurality of electromagnetic signals may be facilitated through the usage of atomic frequency references in the transmitters with improved frequency accuracy and frequency stability relative to non-atomic frequency references (e.g., crystal oscillators). In one example, the plurality of transmitters is geometrically dispersed. Navigation signals may be coded (e.g., via frequency, phase or digital coding) with a deterministic pattern (e.g. a ranging code) to enable the accurate position determination at a receiver associated with the user. In one example, the deterministic pattern may be a pseudo-noise (PN) or pseudo-random noise (PRN) sequence. In another example, the deterministic pattern may be a set of ranging tones. In one example, the deterministic pattern is designed to enable high time resolution. For example, high time resolution enables high range resolution. For example, high range resolution enables high position determination accuracy. In another example, the deterministic pattern is designed to mitigate time ambiguity (i.e., avoid confusion in position determination).

In one example, satellite navigation systems which use radio signals may be disrupted by radio interference. For example, the radio interference may be intentional (e.g., deliberate jamming by undesired radio signals) or unintentional (e.g., reception of other radio signals which are not adequately isolated). That is, satellite navigation systems may have a service disruption due to either intentional or unintentional radio interference. In one example, the service disruption results in unavailability of the satellite navigation system to the users.

Navigation systems may use a navigation reference (e.g. a fiducial marker) to derive a geometric reference frame. For example, the navigation reference may be a known direction or known vector in a geometric space. In one example, the navigation reference may be a plurality of sources at known positions. For example, a plurality of sources may be located on the surface of the Earth with known latitude and longitude coordinates. For example, latitude and longitude are angular coordinates in a geographic coordinate system. For example, a plurality of sources may be celestial objects with known declination and right ascension coordinates. Right ascension is also known as sidereal hour angle. For example, declination and right ascension are angular coordinates in a celestial coordinate system. In one example, the geometric reference frame may be a spatial coordinate system with two or three spatial coordinates. In another example, the geometric reference frame may be a spatial-temporal coordinate system with two or three spatial coordinates and one temporal coordinate. For example, position determination may be made with respect to the geometric reference frame.

A celestial navigation system, for example, using stars as a navigation reference, may have an advantage over other navigation systems since it is passive and since many stars with accurate position knowledge (e.g., known declination and right ascension) are available. For example, the celestial navigation system may use a geometric reference frame known as the celestial coordinate system defined by a celestial equator and a vernal equinox. In addition, the celestial coordinate system may include an ecliptic, i.e., an apparent path of the Sun relative to the Earth. For example, the celestial equator is a projection of the Earth's equator onto the celestial coordinate system. For example, the vernal equinox is a direction defined by an intersection between the celestial equator and the ecliptic.

For example, declination is an angle measured northward relative to the celestial equator and right ascension is an angle measured eastward along the celestial equator relative to the vernal equinox (i.e., intersection of the celestial equator and ecliptic). In one example, the celestial navigation system may be used for position determination of a user by measuring a plurality of stars (i.e., a background star field) relative to a local vertical direction (e.g., gravity vertical direction). For example, a star sensor or a star tracker associated with the user (e.g., co-located with or referenced to the user) with a field of view covering a background star field may be used for position determination of the user. If the celestial navigation system determines position (e.g., declination and right ascension) of the local vertical direction and obtains accurate time, it can compute geographic coordinates (e.g., latitude and longitude) of the user.

In one example, the navigation system (e.g., star tracker) may create an attitude reference, (e.g., a quaternion), which determines the declination and right ascension for every location in the field of view of the star tracker. For example, if there is also a star-like source (e.g. a pseudo-star) in the field of view representing an accurate direction of the local vertical direction, then the declination and right ascension of the local vertical direction may be determined. For example, if time is also determined within a desired accuracy, latitude and longitude of the user may be determined using standard astronomical equations (e.g., declination may be converted into latitude and accurate time allows conversion from right ascension to longitude using an epoch reference as a time reference).

In one example, the celestial navigation system may generate one or more star-like sources which are imaged by the star tracker. In one example, the images are formed in a focal plane of the star tracker. In one example, the image of the one or more star-like sources determines a gravity vector (i.e., gravity direction). The image of the one or more star-like sources enable the star tracker to measure the position of the background star field and the position of the local vertical direction, thus providing the information required to geolocate (i.e., locate on the Earth's surface) the sensor.

In one example, the generation of the one or more star-like sources which are imaged by the star tracker may be a creation of a source beam. In one example, the source beam may be aligned to the local vertical direction when imaged by the star tracker. In one example, the source beam may be created by vertical transmission with a known offset to the local vertical direction (e.g., gravity direction). In one example, if the source beam is retroreflected into the star tracker, an image of the source beam may allow determination of the local vertical direction relative to the background star field. In one example, the known offset may be used to refine the determination of the local vertical direction in the star tracker to an improved accuracy.

Figure 1:
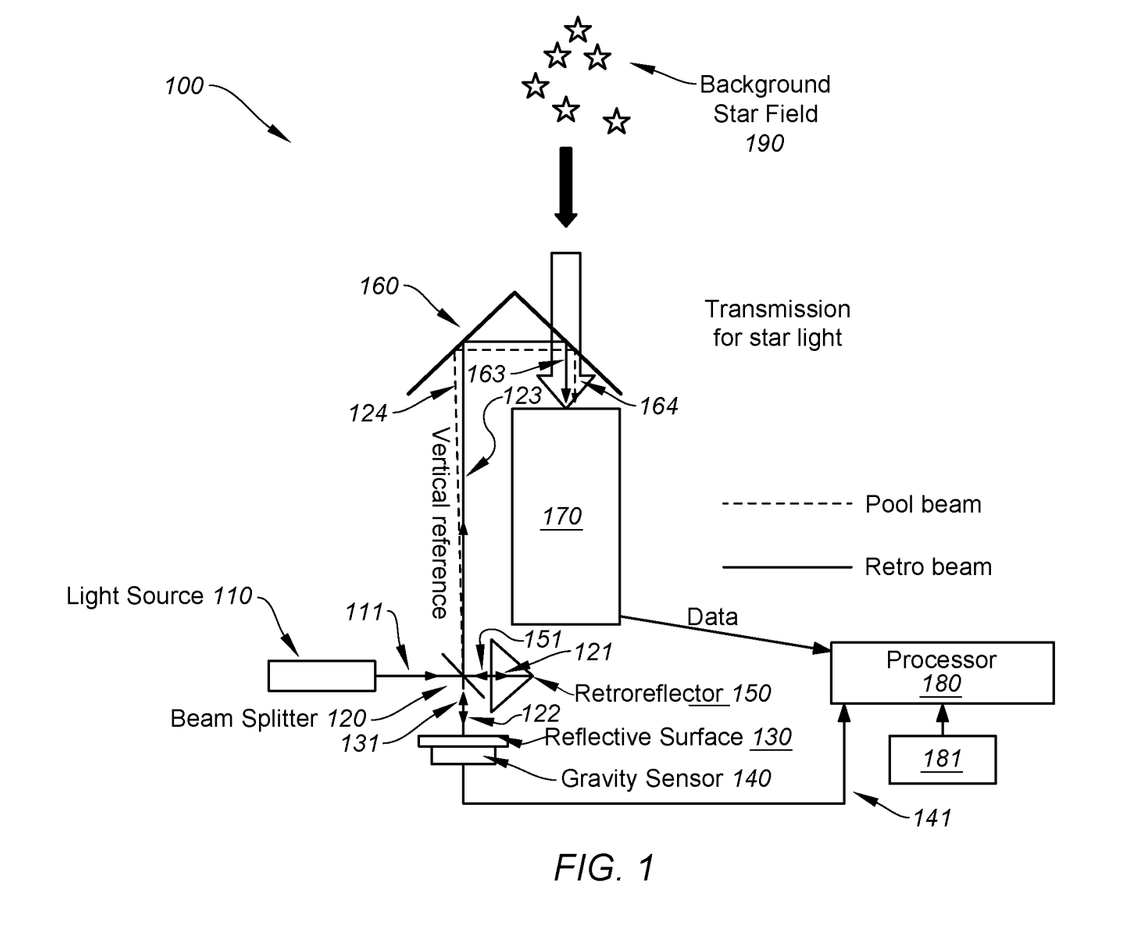
FIG. 1 illustrates a first example of a vertical navigation system.

FIG. 1 illustrates a first example of a vertical navigation system 100. In one example, the vertical navigation system 100 includes a light source 110 with a source beam 111. In one example, the light source 110 is a collimated light source. In one example, the collimated light source is collimated to within a certain tolerance for its particular application. The source beam 111 may be split in two beams by a beam splitter 120 into a first reference beam 121, e.g., a forward propagating beam and a second reference beam 122, e.g., a downward propagating beam. In one example, the second reference beam 122 (e.g. downward propagating beam) reflects off a mirror (e.g., reflective surface 130) to produce a reflected beam 131. In one example, the mirror (e.g., reflective surface 130) has a known alignment to a local vertical direction using a gravity sensor measurement. The reflected beam 131 may propagate upward and get retroreflected by a hollow retroreflector 160 into an attitude sensor 170.

In one example, the first reference beam 121 (e.g., forward propagating beam) is retroreflected back to the beam splitter 120 which in turn reflects it upward into the hollow retroreflector 160 and then into the attitude sensor 170. This particular optical system produces two star-like sources to be measured by the star tracker, and the average of their positions is aligned to the normal of the reflective surface. If that normal is measured with respect to the local vertical direction, then the average position of the two reference beams plus time and the gravity sensor measurement can be used to determine the latitude and longitude of the sensor. In one example, the light source 110 is a star-like source.

In one example, the light source 110 generates a source beam 111 which operates at visible wavelengths (e.g., between 400 and 700 nm wavelength). In one example, the source beam 111 operates at infrared wavelengths (e.g., greater than 700 nm wavelength). In one example, the source beam 111 operates at ultraviolet wavelengths (e.g., less than 400 nm wavelength). For example, the light source 110 may be a laser or a coherent light source. For example, the coherent light source produces a source beam 111 which is highly correlated temporally or spatially. The source beam 111 may be incident onto a beam splitter 120. In one example, the beam splitter 120 transmits a first reference beam 121 (e.g., a forward propagating beam) from a first side of the beam splitter 120 to a first direction. In one example, the first direction is a positive nominal horizontal direction. In one example, the beam splitter 120 reflects a second reference beam 122 (e.g., a downward propagating beam) from the first side of the beam splitter 120 to a second direction. In one example, the first direction and the second direction are approximately perpendicular. In one example, the second direction is a negative nominal vertical direction. In one example, the light source 110 is a star-like source.

In one example, the first reference beam 121 may be determined by a transmittance of the beam splitter 120. In one example, the second reference beam 122 may be determined by a reflectance of the beam splitter 120. In one example, the transmittance is a positive value between 0 and 1 and denotes the first fraction of an incident beam which is transmitted through the beam splitter 120. In one example, the reflectance is a positive value between 0 and 1 and denotes the second fraction of an incident beam which is reflected from the surface. In one example, the sum of the transmittance and the reflectance is no greater than one. For example, an absorbance of the beam splitter 120 denotes a third fraction of the incident beam which is absorbed by the beam splitter 120. In one example, the sum of the transmittance, the reflectance and the absorbance is equal to one.

In one example, the first reference beam 121 may be reflected into a third direction by a retroreflector 150 to produce a retroreflected beam 151. In one example, the third direction is opposite to the first direction. In one example, the retroreflected beam 151 may be incident onto the beam splitter 120. In one example, the beam splitter 120 reflects a third fraction of the retroreflected beam into a fourth direction to produce a first source reference 123. In one example, the first source reference 123 is a retro beam.

In one example, the second reference beam 122 may be reflected from the second direction by a reflective surface 130 to produce a reflected beam 131. In one example, the reflective surface 130 is a mirror or a gravity mirror. In one example, the reflected beam 131 may be incident onto the beam splitter 120. In one example, the beam splitter 120 transmits a fourth fraction of the reflected beam into the fourth direction to produce a second source reference 124. In one example, the second source reference 124 is a gravity reference beam.

In one example, the reflective surface 130 is attached to a gravity sensor 140. For example, the gravity sensor 140 may be an accelerometer or a microelectromechanical sensor (MEMS) device. In one example, the gravity sensor 140 measures the alignment of the reflective surface 130 with respect to a gravity vector to produce a gravity vector measurement 141 (not shown). In one example, the alignment of the reflective surface 130 may be expressed in terms of tip and tilt. In one example, tip and tilt are orthogonal angles which represent linear errors in nominally orthogonal axes. In one example, the gravity vector is in the negative vertical direction and provides an absolute orientation reference. In one example, the reflective surface 130 is approximately orthogonal to the gravity vector.

In one example, the first source reference 123 and the second source reference 124 are incident to a hollow retroreflector 160 (labeled in FIG. 1 as "hollow retro") which produces a first vertical reference 163 and a second vertical reference 164. In one example, the first vertical reference 163 is a reflected retro beam. In one example, the second vertical reference 164 is a reflected gravity reference beam. In one example, the first vertical reference 163 and the second vertical reference 164 operate at a reference wavelength. In one example, the reference wavelength is a visible wavelength. In one example, the reference wavelength is an infrared wavelength. In one example, the reference wavelength is an ultraviolet wavelength.

In one example, the attitude sensor 170 captures (i.e., obtains images of) the first vertical reference 163 and the second vertical reference 164. In one example, the attitude sensor 170 is a star sensor, star tracker or imager. In one example, the attitude sensor 170 operates at visible wavelengths (e.g., between 400 and 700 nm wavelength). In one example, the attitude sensor 170 operates at infrared wavelengths (e.g., greater than 700 nm wavelength). In one example, the attitude sensor 170 operates at ultraviolet wavelengths (e.g., less than 400 nm wavelength). In one example, the attitude sensor 170 uses sensor coordinates in a sensor coordinate system to measure angles. In one example, sensor coordinates may be celestial coordinates. In one example, the attitude sensor 170 is sensitive to the reference wavelength of the first vertical reference 163 and the second vertical reference 164.

In one example, the attitude sensor 170 captures (e.g. forms an image of) a background star field 190 to produce a background star field image 191 (not shown). In one example, the background star field 190 includes a plurality of stars and other celestial objects. In one example, celestial objects include stars, planets, nebulae, or any physical entity in the observable universe, etc. In one example, the background star field 190 includes a plurality of reference stars with known celestial coordinates. In one example, the background star field 190 is transmitted through the hollow retroreflector 160 with 98% transmittance.

In one example, the attitude sensor 170 measures a first sensor coordinate associated with the first vertical reference 163, a second sensor coordinate associated with the second vertical reference 164 and a third sensor coordinate associated with the plurality of reference stars. For example, the attitude sensor 170 measures a first set of angles with respect to the sensor coordinate system for the first vertical reference 163 and a second set of angles with respect to the sensor coordinate system for the second vertical reference 164. For example, the attitude sensor 170 measures a third set of angles with respect to the sensor coordinate system for the plurality of reference stars. In one example, the sensor coordinate system uses celestial coordinates. For example, celestial coordinates may be declination and right ascension (or sidereal hour angle). In one example, the first set of angles and the second set of angles are unaligned vertical coordinates. In one example, the unaligned vertical coordinates include an angular offset relative to the local vertical direction.

In one example, the attitude sensor 170 measures the first set of angles and the second set of angles with respect to the plurality of reference stars using the third set of angles. In one example, the attitude sensor 170 transfers the first set of angles and the second set of angles to a processor 180. In one example, the first set of angles are a first pair of angular coordinates (e.g., a first declination and a first right ascension). In one example, the second set of angles are a second pair of angular coordinates (e.g., a second declination and a second right ascension).

In one example, the plurality of reference stars with known celestial coordinates are part of a star catalog. In one example, the star catalog is a database of reference stars with associated celestial coordinates. In one example, the star catalog is part of the attitude sensor 170. In one example, the star catalog is part of the processor 180. In one example, the processor 180 includes a processing unit and a memory. In another example, the processor 180 is part of the attitude sensor 170.

In one example, the processor 180 receives the gravity vector measurement 141 from the gravity sensor 140. In one example, the processor 180 combines the first set of angles, the second set of angles and the gravity vector measurement 141 to produce an aligned vertical reference.

In one example, the processor 180 receives a time signal 181. In one example, the time signal 181 includes a time message 182 (e.g., coordinated universal time (UTC) message) and a time synchronization pulse 183 (e.g., a 1 pulse per second (pps) signal). The time message 182 and the time synchronization pulse 183 are not shown in FIG. 1 since these signals are part of the time signal 181. In one example, the time signal 181 may be generated by a navigation receiver (e.g., a GPS receiver). In one example, the time signal 181 may be generated by a reference clock (e.g., atomic clock, crystal oscillator clock, network time protocol (NTP) server, precision time protocol (PTP) server, software-based clock, etc.). In one example, the time synchronization pulse 183 is used to indicate a time instant corresponding to the time message 182. In one example, the processor 180 produces aligned geographical coordinates of a vertical position by combining the aligned vertical reference with the time signal 181. For example, the time signal 181 may be used to convert right ascension to longitude (e.g., by accounting for the Earth's rotation).

In one example, the aligned geographical coordinates are latitude and longitude of the vertical position. For example, the aligned geographical coordinates may be output data from the vertical navigation system. In one example, the aligned vertical reference is an average of the first vertical reference and a gravity-aligned second vertical reference. In one example, the gravity-aligned second vertical reference is obtained from the second vertical reference using the gravity vector measurement.

Figure 2:
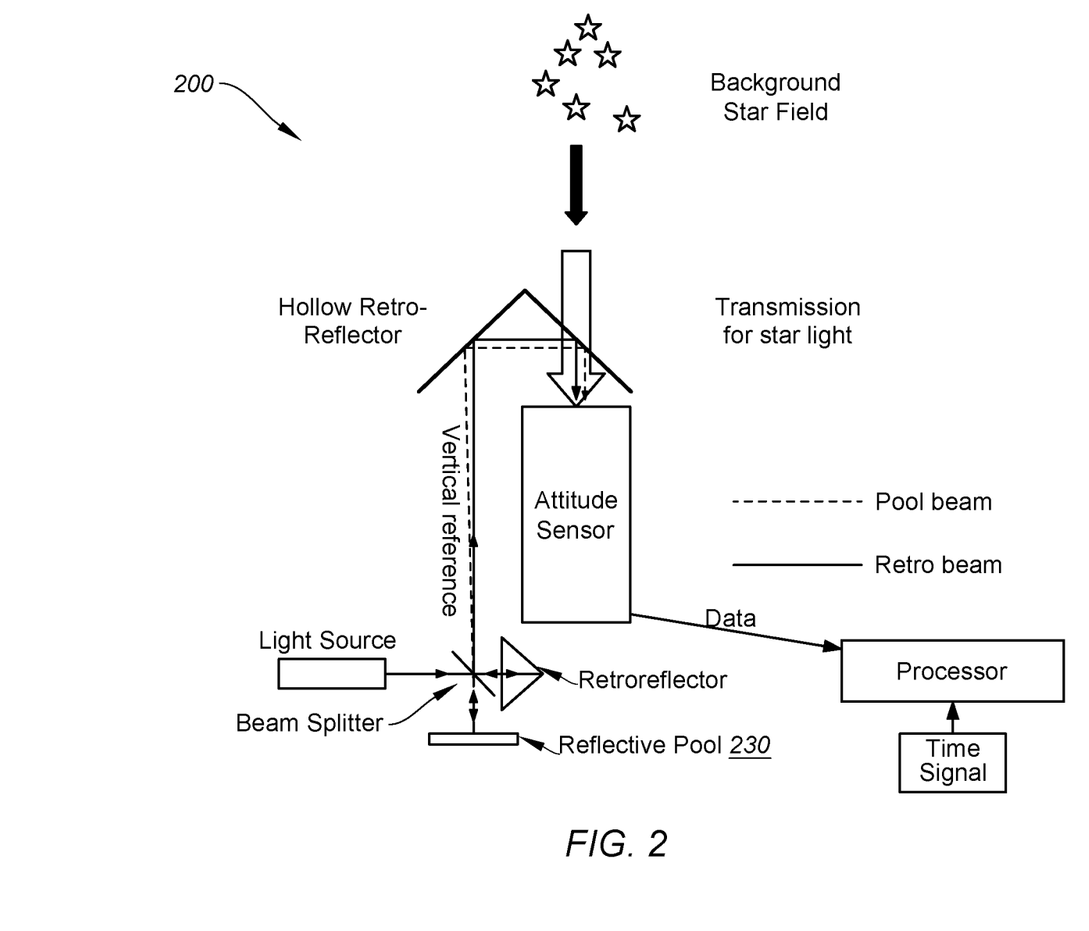
FIG. 2 illustrates a second example of a vertical navigation system.

FIG. 2 illustrates a second example of a vertical navigation system 200. In one example, the vertical navigation system 200 includes all the elements as described in the first embodiment except that a reflective pool 230 replaces the reflective surface 130 and gravity sensor 140. For the sake of brevity, the other elements are not described here as their respective descriptions have already been presented with respect to FIG. 1. In one example, the reflective pool 230 may be a reflective liquid such as liquid mercury, liquid gallium or liquid metal. In one example, the reflective pool has a surface which is normal to the gravity vector. In one example, the reflective pool 230 contains a reflective liquid, such as mercury, whose surface automatically aligns itself approximately perpendicular to the gravity vertical.

Figure 3:
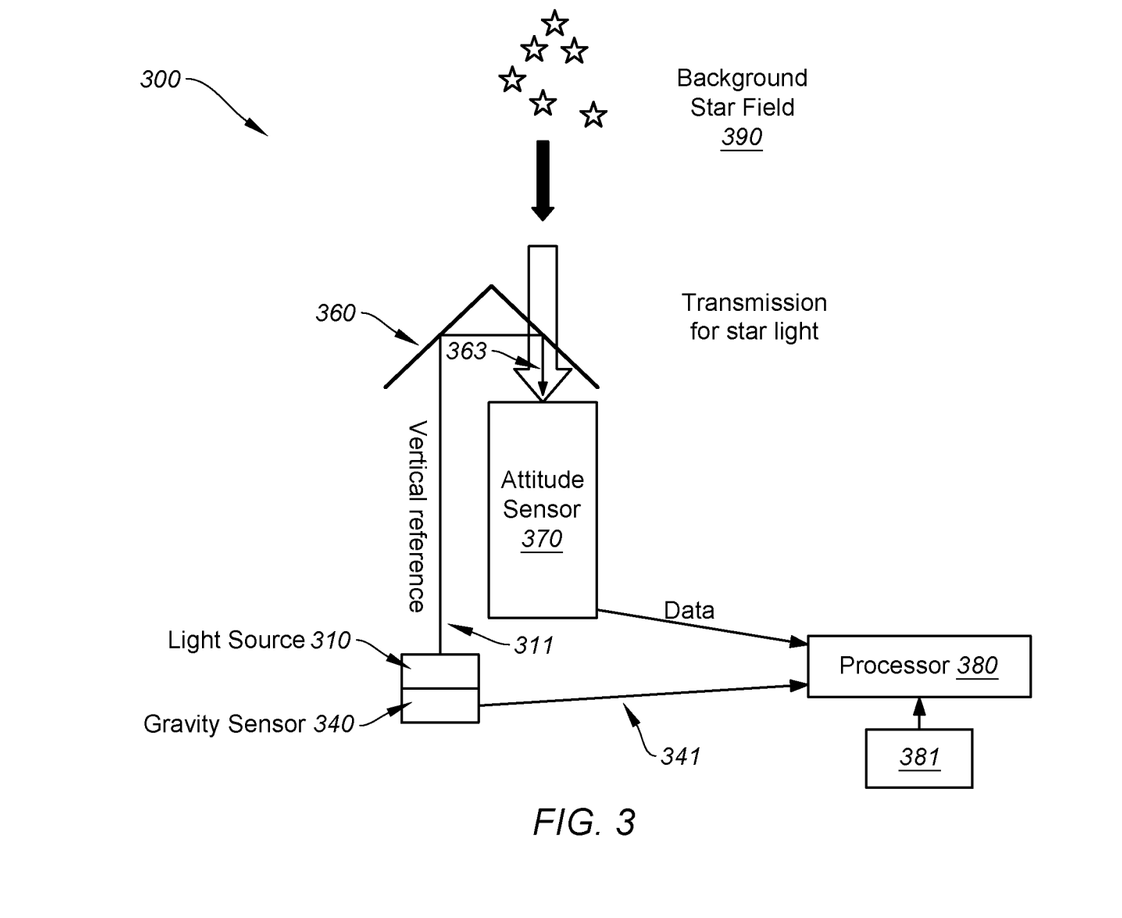
FIG. 3 illustrates a third example of a vertical navigation system.

FIG. 3 illustrates a third example of a vertical navigation system 300. In one example, vertical navigation system 300 includes a light source 310. As shown in FIG. 3, the light source 310 is positioned vertically and may be referred to as a vertical light source. In one example, the light source 310 is a collimated light source. In one example, the light source is a laser light source. In one example, the light source 310 is a star-like source. In one example, the light source 310 is a coherent light source. For example, the coherent light source produces a source beam 311 which is highly correlated temporally or spatially.

In one example, the light source 310 generates a source beam 311 which operates at visible wavelengths (e.g., between 400 and 700 nm wavelength). In one example, the source beam 311 operates at infrared wavelengths (e.g., greater than 700 nm wavelength). In one example, the source beam operates at ultraviolet wavelength (e.g., less than 400 nm wavelength). The source beam 311 may be directed in a first direction. In one example, the first direction is a nominal vertical direction.

In one example, the light source 310 is attached to a gravity sensor 340. For example, the gravity sensor 340 may be an accelerometer or a micromachined electromechanical sensor (MEMS) device. In one example, the gravity sensor 340 measures the alignment of the light source 310 with respect to a gravity vector to produce a gravity vector measurement 341. In one example, the gravity vector is in a negative vertical direction and provides an absolute orientation reference.

In one example, the gravity sensor 340 measures the direction of a source beam with respect to the local vertical direction. That source beam may be transmitted vertically and then retroreflected into the star tracker to create a star-like source which is tracked along with the background star field. Since the local vertical direction is known with respect to gravity, its measured position in the star tracker can be used to provide a measurement of the latitude and longitude of the sensor.

In one example, a top surface of the light source 310 is approximately orthogonal to the gravity vector. In one example, the alignment of the light source 310 may be expressed in terms of tip and tilt. In one example, the source beam 311 is incident to a hollow retroreflector 360 (labeled in FIG. 3 as "hollow retro") which produces a vertical reference 363. In one example, the vertical reference 363 is a reflected source beam. In one example, the vertical reference 363 operates at a reference wavelength. In one example, the reference wavelength is a visible wavelength.

In one example, the reference wavelength is an infrared wavelength. In one example, the reference wavelength is an ultraviolet wavelength.

In one example, an attitude sensor 370 captures (i.e., obtains images of) the vertical reference 363. In one example, the attitude sensor 370 is a star tracker or imager. In one example, the attitude sensor 370 operates at visible wavelengths (e.g., between 400 and 700 nm wavelength). In one example, the attitude sensor 370 operates at infrared wavelengths (e.g., greater than 700 nm wavelength). In one example, the attitude sensor 370 operates at ultraviolet wavelengths (e.g., less than 400 nm wavelength). In one example, the attitude sensor 370 is sensitive to the reference wavelength of the vertical reference 363.

In one example, the attitude sensor 370 captures a background star field 390 and produces a background star field image 391 (not shown). In one example, the background star field 390 includes a plurality of stars and other celestial objects. In one example, the background star field 390 includes a plurality of reference stars with known celestial coordinates. In one example, the background star field 390 is transmitted through the hollow retroreflector 360 with 98% transmittance.

In one example, the attitude sensor 370 measures a set of angles with respect to a first coordinate system for the vertical reference 363 with respect to the first coordinate system using the plurality of reference stars. In one example, the first coordinate system is celestial coordinates. For example, celestial coordinates may be declination and right ascension. In one example, the attitude sensor 370 transfers the measured set of angles to a processor 380. In one example, the measured set of angles may be represented by a pair of angular coordinates (e.g., a declination and a right ascension).

In one example, the plurality of reference stars with known celestial coordinates are part of a star catalog. In one example, the star catalog is a database of reference stars with associated celestial coordinates. In one example, the star catalog is part of the attitude sensor 370. In one example, the star catalog is part of the processor 380. In one example, the processor 380 includes a processing unit and a memory. In one example, the processor 380 is part of the attitude sensor 370. In one example, the processor 380 determines angular coordinates of an aligned vertical reference using the gravity vector measurement 341 and the sensor coordinates of the vertical reference 363 and the background star field image 391. In one example, the gravity vector measurement 341 is obtained by the gravity sensor 340. In one example, the processor 380 combines the unaligned vertical coordinates with the gravity vector measurement 341 to produce the aligned vertical reference.

In one example, the processor 380 receives a time signal 381. In one example, the time signal 381 includes a time message (e.g., coordinated universal time (UTC)) and a time synchronization pulse (e.g., a 1 pulse per second (pps) signal). In one example, the time signal 381 may be generated by a navigation receiver (e.g., a GPS receiver). In one example, the time signal 381 may be generated by a reference clock (e.g., atomic clock, crystal oscillator clock, network time protocol (NTP) server, precision time protocol (PTP) server, software-based clock, etc.). In one example, the time synchronization pulse is used to indicate a time instant corresponding to the time message.

In one example, the processor 380 combines the aligned vertical reference and the time signal to produce aligned geographical coordinates of a vertical position. In one example, the aligned geographical coordinates are latitude and longitude of the vertical position. For example, the aligned geographical coordinates may be output data from the vertical navigation system.

Figure 4:
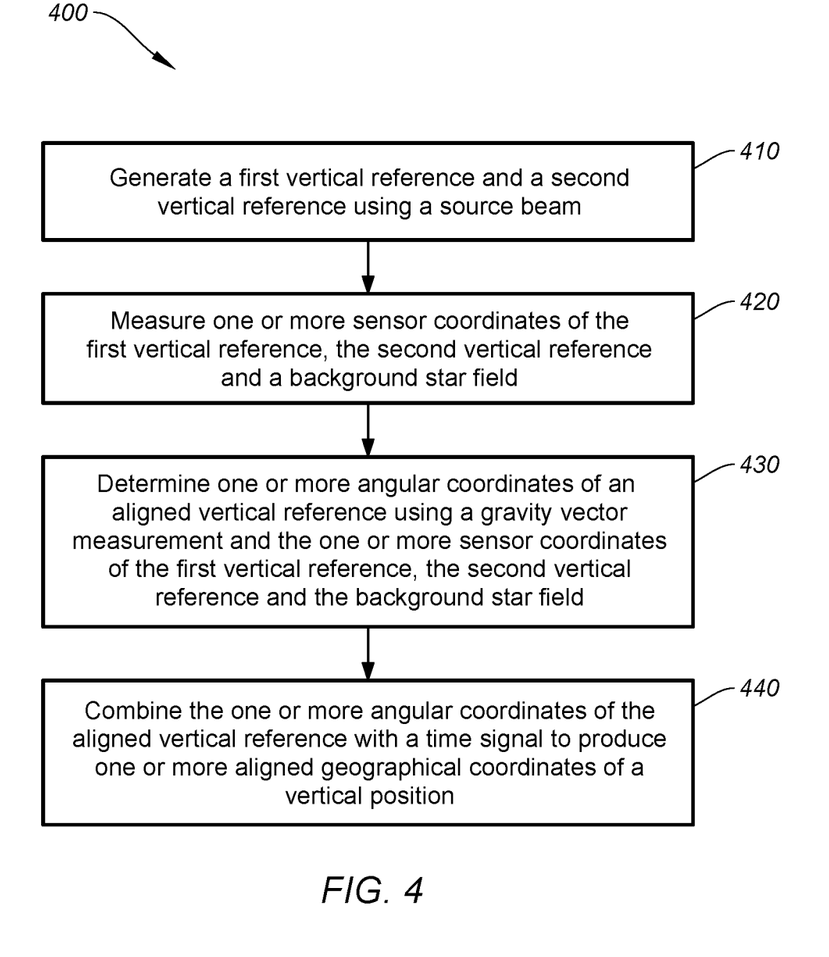
FIG. 4 illustrates a flow diagram for position determination using the example vertical navigation system illustrated in FIG. 1.

FIG. 4 illustrates a flow diagram 400 for position determination using the example vertical navigation system illustrated in FIG. 1. In block 410, generate a first vertical reference and a second vertical reference using a source beam. In one example, the source beam is generated by a light source. In one example, the light source is a laser. In one example, the light source is a coherent light source. In one example, the source beam operates at visible wavelengths. In one example, the source beam operates at infrared wavelengths. In one example, the source beam operates at ultraviolet wavelengths. In one example, the first vertical reference is a reflected retro beam.

In one example, the second vertical reference is a reflected gravity reference beam. For example, the reflected gravity reference beam may be reflected by a reflective surface. In one example, the reflective surface is associated with a gravity sensor. In one example, the gravity sensor measures the alignment of the reflective surface with respect to a gravity vector. For example, the gravity sensor may be an accelerometer or a MEMS device. In one example, the generation of the first vertical reference and the second vertical reference may be performed by a light source (e.g., laser).

In block 420, measure one or more sensor coordinates of the first vertical reference, the second vertical reference and a background star field. In one example, the one or more sensor coordinates include a first sensor coordinate associated with the first vertical reference, a second sensor coordinate associated with the second vertical reference, and/or a third sensor coordinate associated with the background star field. In another example, the one or more sensor coordinates include a sensor coordinate associated with two or more of the first vertical reference, the second vertical reference or the background star field. In one example a sensor coordinate represents one dimension. In another example, a sensor coordinate represents two dimensions. In one example, the background star field includes a plurality of stars and other celestial objects. In one example, the background star field includes a plurality of reference stars with known celestial coordinates. In one example, the one or more sensor coordinates are a first set of angles for the first vertical reference and a second set of angles for the second vertical reference with respect to the plurality of reference stars.

In one example, the sensor coordinates are star sensor coordinates. In one example, the measuring of the sensor coordinates may be performed by an attitude sensor. In one example, the attitude sensor is a star sensor or a star tracker. For example, the background star field is part of a star catalog.

In block 430, determine one or more angular coordinates of an aligned vertical reference using a gravity vector measurement and the one or more sensor coordinates of the first vertical reference, the second vertical reference and the background star field. In one example, the aligned vertical reference is an average of the first vertical reference and a gravity-aligned second vertical reference. In one example, the gravity-aligned second vertical reference is obtained from the second vertical reference using the gravity vector measurement. In one example, the gravity vector measurement is obtained by the gravity sensor. In one example, the angular coordinates are declination and right ascension. In one example, the angular coordinates are declination and sidereal hour angle. In one example, the determination of angular coordinates of the aligned vertical reference may be performed by a processor.

In block 440, combine the one or more angular coordinates of the aligned vertical reference with a time signal to produce one or more aligned geographical coordinates of a vertical position. In one example, the time signal includes a time message (e.g. a coordinated universal time (UTC) message) and a time synchronization pulse (e.g., a 1 pulse per second (pps) signal). For example, the aligned geographical coordinates may be aligned latitude and longitude coordinates of the vertical position. In one example, the combining of angular coordinates with a time signal to produce aligned geographical coordinates may be performed by a processor. In one example, the time signal may be generated by a navigation receiver (e.g., a GPS receiver) or by a reference clock (e.g., atomic clock, crystal oscillator clock, network time protocol (NTP) server, precision time protocol (PTP) server, software-based clock, etc.).

Figure 5:
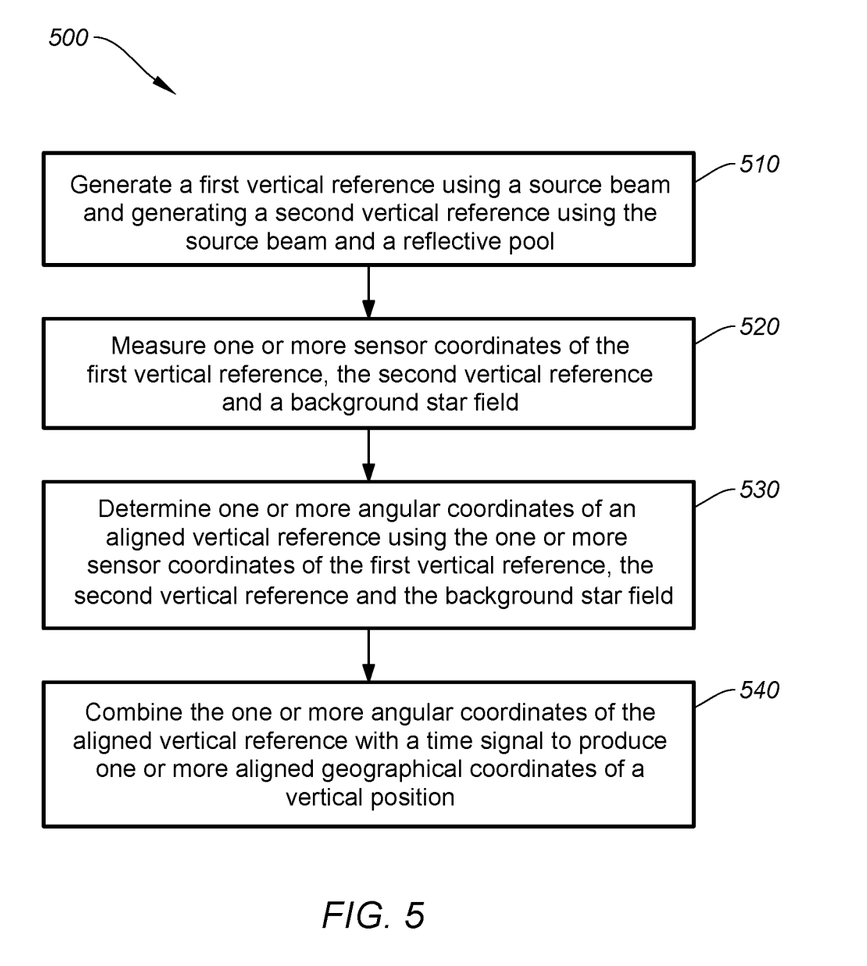
FIG. 5 illustrates a flow diagram for position determination using the example vertical navigation system illustrated in FIG. 2.

FIG. 5 illustrates a flow diagram 500 for position determination using the example vertical navigation system illustrated in FIG. 2. In block 510, generate a first vertical reference using a source beam and generating a second vertical reference using the source beam and a reflective pool. In one example, the source beam is generated by a light source. In one example, the light source is a laser. In one example, the light source is a coherent light source. In one example, the source beam operates at visible wavelengths. In one example, the source beam operates at infrared wavelengths. In one example, the source beam operates at ultraviolet wavelengths. In one example, the first vertical reference is a reflected retro beam. In one example, the second vertical reference is a reflected gravity reference beam. For example, the reflected gravity reference beam may be reflected by the reflective pool. In one example, the reflective pool may be a reflective liquid such as liquid mercury. In another example, the reflective pool may be liquid gallium or a liquid metal. In one example, the reflective pool has a surface which is normal to the gravity vector.

In block 520, measure one or more sensor coordinates of the first vertical reference, the second vertical reference and a background star field. In one example, the one or more sensor coordinates include a first sensor coordinate associated with the first vertical reference, a second sensor coordinate associated with the second vertical reference, and/or a third sensor coordinate associated with the background star field. In another example, the one or more sensor coordinates include a sensor coordinate associated with two or more of the first vertical reference, the second vertical reference or the background star field. In one example a sensor coordinate represents one dimension. In another example, a sensor coordinate represents two dimensions.

In one example, the sensor coordinates are star sensor coordinates. In one example, the measuring of the sensor coordinates may be performed by an attitude sensor. In one example, the attitude sensor is a star sensor or a star tracker. For example, the background star field is part of a star catalog. In one example, the background star field includes a plurality of stars and other celestial objects. In one example, celestial objects include stars, planets, nebulae, any physical entity in the observable universe, etc. In one example, the background star field includes a plurality of reference stars with known celestial coordinates.

In block 530, determine one or more angular coordinates of an aligned vertical reference using the one or more sensor coordinates of the first vertical reference, the second vertical reference and the background star field. In one example, the aligned vertical reference is an average of the first vertical reference and the second vertical reference. In one example, the angular coordinates are declination and right ascension. In one example, the angular coordinates are declination and sidereal hour angle. In one example, the determination of angular coordinates of the aligned vertical reference may be performed by a processor.

In block 540, combine the one or more angular coordinates of the aligned vertical reference with a time signal to produce one or more aligned geographical coordinates of a vertical position. In one example, the time signal includes a time message (e.g. a coordinated universal time (UTC) message) and a time synchronization pulse (e.g., a 1 pulse per second (pps) signal). For example, the aligned geographical coordinates may be aligned latitude and longitude coordinates of the vertical position.

Figure 6:
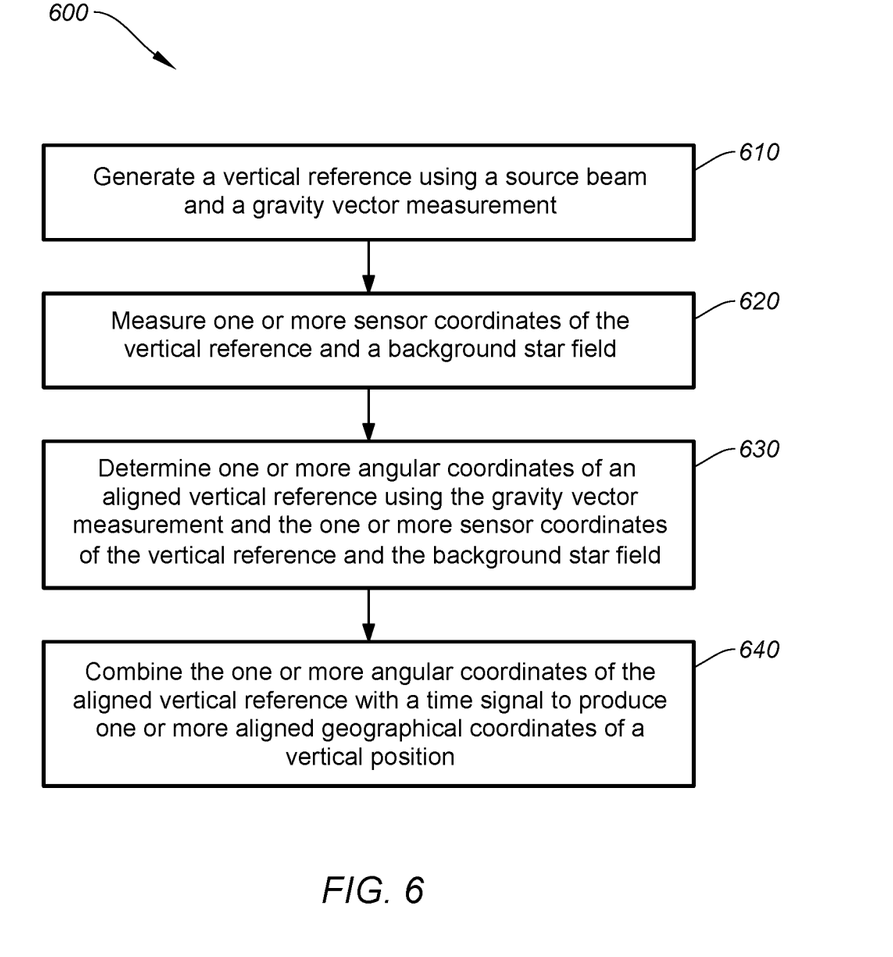
FIG. 6 illustrates a flow diagram for position determination using the example vertical navigation system illustrated in FIG. 3.

FIG. 6 illustrates a flow diagram 600 for position determination using the example vertical navigation system illustrated in FIG. 3. In block 610, generate a vertical reference using a source beam and a gravity vector measurement. In one example, the source beam is generated by a light source. In one example, the light source is a laser. In one example, the light source is a coherent light source. In one example, the source beam operates at visible wavelengths. In one example, the source beam operates at infrared wavelengths. In one example, the source beam operates at ultraviolet wavelengths. In one example, the vertical reference is a gravity reference beam. For example, the vertical reference may be aligned by a gravity sensor attached to the light source. For example, the gravity sensor may be an accelerometer or a micromachined electromechanical sensor (MEMS) device. In one example, the gravity sensor measures the alignment of the light source with respect to a gravity vector to produce the gravity vector measurement. In one example, the alignment of the light source may be expressed in terms of tip and tilt. In one example, the gravity vector is in a negative vertical direction and provides an absolute orientation reference. In one example, a top surface of the light source is approximately orthogonal to the gravity vector.

In block 620, measure one or more sensor coordinates of the vertical reference and a background star field. In one example, the one or more sensor coordinates include a first sensor coordinate associated with the first vertical reference and/or a second sensor coordinate associated with the background star field. In another example, the one or more sensor coordinates include a sensor coordinate associated with two or more of the first vertical reference or the background star field. In one example a sensor coordinate represents one dimension. In another example, a sensor coordinate represents two dimensions.

In one example, the sensor coordinates are star sensor coordinates. In one example, the measuring of the sensor coordinates may be performed by an attitude sensor. In one example, the attitude sensor is a star sensor or a star tracker. For example, the background star field is part of a star catalog. In one example, the background star field includes a plurality of stars and other celestial objects. In one example, celestial objects include stars, planets, nebulae, any physical entity in the observable universe, etc. In one example, the background star field includes a plurality of reference stars with known celestial coordinates.

In block 630, determine one or more angular coordinates of an aligned vertical reference using the gravity vector measurement and the one or more sensor coordinates of the vertical reference and the background star field. In one example, the aligned vertical reference is a gravity-aligned vertical reference obtained from the vertical reference using the gravity vector measurement. In one example, the gravity vector measurement is obtained by the gravity sensor. In one example, the angular coordinates are declination and right ascension. In one example, the angular coordinates are declination and sidereal hour angle. In one example, the determination of angular coordinates of the aligned vertical reference may be performed by a processor.

In block 640, combine the one or more angular coordinates of the aligned vertical reference with a time signal to produce one or more aligned geographical coordinates of a vertical position. In one example, the time signal includes a time message (e.g. a coordinated universal time (UTC) message) and a time synchronization pulse (e.g., a 1 pulse per second (pps) signal). For example, the aligned geographical coordinates may be aligned latitude and longitude coordinates of the vertical position.

In one aspect, one or more of the steps for acquiring geographic coordinates using a vertical navigation system in FIGS. 4, 5 and/or 6 may be executed by one or more processors which may include hardware, software, firmware, etc. In one aspect, one or more of the steps in FIGS. 4, 5 and/or 6 may be executed by one or more processors which may include hardware, software, firmware, etc. The one or more processors, for example, may be used to execute software or firmware needed to perform the steps in the flow diagrams of FIGS. 4, 5 and/or 6. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for acquiring geographic coordinates using a vertical navigation system. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

What is claimed is:

1. A vertical navigation system, comprising:
   a light source to generate a source beam;
   a beam splitter coupled to the light source, the beam splitter to generate a first source reference and a second source reference, wherein the first source reference and the second source reference are derived from the source beam;
   a hollow retroreflector coupled to the beam splitter, the hollow retroreflector to produce a first vertical reference and a second vertical reference, wherein the first vertical reference is derived from the first source reference and the second vertical reference is derived from the second source reference;
   an attitude sensor coupled to the hollow retroreflector, the attitude sensor to capture a plurality of reference stars and to measure a first set of angles for the first vertical reference and a second set of angles for the second vertical reference, wherein the first set of angles and the second set of angles are relative to the plurality of reference stars; and
   a processor coupled to the attitude sensor, the processor to produce one or more aligned geographical coordinates of a vertical position using the first set of angles, the second set of angles, a gravity vector measurement and a time signal.

2. The vertical navigation system of claim 1, wherein the light source is a laser or a coherent light source.

3. The vertical navigation system of claim 1, wherein the light source operates at visible, infrared or ultraviolet wavelengths.

4. The vertical navigation system of claim 1, wherein the first source reference and the second source reference are derived from the source beam using a retroreflector and a reflective surface.

5. The vertical navigation system of claim 4, wherein the reflective surface is a mirror or a gravity mirror.

6. The vertical navigation system of claim 5 further comprising a gravity sensor, wherein the gravity sensor is coupled to the reflective surface.

7. The vertical navigation system of claim 6, wherein the gravity sensor measures an alignment of the reflective surface to produce the gravity vector measurement.

8. The vertical navigation system of claim 1, wherein the attitude sensor is a star tracker or star sensor.

9. The vertical navigation system of claim 1, wherein the attitude sensor uses one or more celestial coordinates.

10. The vertical navigation system of claim 1, wherein the plurality of reference stars includes at least two known celestial coordinates.

11. The vertical navigation system of claim 1, wherein one of the at least two known celestial coordinates is declination and another of the at least two known celestial coordinates is right ascension.

12. The vertical navigation system of claim 1, wherein the time signal includes a time message and a time synchronization pulse.

13. The vertical navigation system of claim 1, wherein the aligned geographical coordinates are latitude and longitude of the vertical position.

\* \* \* \* \*